United States Patent
Sato et al.

(10) Patent No.: US 9,516,148 B2
(45) Date of Patent: Dec. 6, 2016

(54) COMPUTER-READABLE RECORDING MEDIUM, INFORMATION MANAGEMENT METHOD AND INFORMATION MANAGEMENT DEVICE

(75) Inventors: Hiroko Sato, Kawasaki (JP); Wataru Aiba, Inagi (JP); Minoru Imaizumi, Maebashi (JP); Yoichi Iwakura, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 388 days.

(21) Appl. No.: 13/591,800

(22) Filed: Aug. 22, 2012

(65) Prior Publication Data
US 2013/0066956 A1  Mar. 14, 2013

Related U.S. Application Data

(63) Continuation of application No. PCT/JP2010/052775, filed on Feb. 23, 2010.

(51) Int. Cl.
| G06F 15/177 | (2006.01) |
| G06F 15/173 | (2006.01) |
| H04L 29/06 | (2006.01) |
| H04L 12/24 | (2006.01) |

(52) U.S. Cl.
CPC ........... H04L 69/28 (2013.01); H04L 41/0253 (2013.01)

(58) Field of Classification Search
CPC ............... H04L 29/06; H04L 29/08981; H04L 29/08072; H04L 41/082; H04L 41/0213; H04L 41/22; H04L 41/12; G06F 8/65
USPC ........................................................ 709/221
See application file for complete search history.

(56) References Cited

U.S. PATENT DOCUMENTS

| 6,189,030 B1 * | 2/2001 | Kirsch ............. G06F 17/30876 705/14.55 |
| 6,308,205 B1 * | 10/2001 | Carcerano ........... H04L 41/0253 709/220 |
| 6,631,407 B1 * | 10/2003 | Mukaiyama ........ H04L 41/0213 709/203 |

(Continued)

FOREIGN PATENT DOCUMENTS

| JP | 2000-201156 | 7/2000 |
| JP | 2000-347975 | 12/2000 |

(Continued)

OTHER PUBLICATIONS

Japanese Office Action mailed Dec. 17, 2013 in corresponding Japanese Application No. 2012-501559.

(Continued)

Primary Examiner — David Lazaro
Assistant Examiner — Mahran Abu Roumi
(74) Attorney, Agent, or Firm — Staas & Halsey

(57) ABSTRACT

An information management device includes: a receiving unit that receives a request of information from an information process unit having a CGI; an information collection unit that collects the information corresponding to the request; and a process unit that requests the information collection unit to collect the information corresponding to the request in response to the request of information, and during a time period shorter than a timeout period of the CGI, generates progress information indicating progress of collection of the information and corrected information, and causes a display unit to display the progress information.

14 Claims, 9 Drawing Sheets

(56) References Cited

U.S. PATENT DOCUMENTS

| | | | |
|---|---|---|---|
| 2002/0087888 A1* | 7/2002 | Yamakawa | H04L 12/2803 726/11 |
| 2004/0111493 A1 | 6/2004 | Yamaguchi et al. | |
| 2004/0215592 A1* | 10/2004 | Matsuura | G06Q 10/02 |
| 2009/0099668 A1* | 4/2009 | Lehman | G05B 19/0428 700/80 |
| 2009/0228547 A1* | 9/2009 | Miyaoka | H04L 67/1095 709/203 |

FOREIGN PATENT DOCUMENTS

| | | |
|---|---|---|
| JP | 2001-51925 | 2/2001 |
| JP | 2003-303196 | 10/2003 |
| JP | 2004-127278 | 4/2004 |

OTHER PUBLICATIONS

International Search Report and Written Opinion mailed May 25, 2010 in corresponding International Application PCT/JP2010/052775.

Japanese Office Action issued Aug. 5, 2014 in corresponding Japanese Patent Application No. 2012-501559.

* cited by examiner

FIG. 2

| Interface Name | Status | MAC Address | Type | Speed | IP Address | Subnet Mask |
|---|---|---|---|---|---|---|
| eth0 | Up | 00:0B:5D:xx:xx:xx | Ether | 100Mbps | 192.168.x.x | 255.255.255.0 |
| eth1 | Down | 00:0B:5D:xx:xx:xx | Ether | 100Mbps | - | - |
| eth2 | Up | 00:0B:5D:xx:xx:xx | Ether | 100Mbps | 192.168.x.x | 255.255.255.0 |
| eth3 | Up | 00:0B:5D:xx:xx:xx | Ether | 100Mbps | 192.168.x.x | 255.255.255.0 |
| eth4 | Down | 00:0B:5D:xx:xx:xx | Ether | 10Mbps | - | - |

SYSTEM | NETWORK | USER

NETWORK > NETWORK INTERFACE

Network Interfaces

FIG. 4

Network Interfaces

Collecting information of Network interfaces ...
    ALL      :
    FINISHED :

| Interface Name | Status | MAC Address | Type | Speed | IP Address | Subnet Mask |
|---|---|---|---|---|---|---|
|  |  |  |  |  |  |  |
|  |  |  |  |  |  |  |
|  |  |  |  |  |  |  |

FIG. 6

```
[status]
all = 5
finished = 3

[no1]
cat1 = eth0
cat2 = Up
cat3 = 00:0B:5D:xx:xx:xx
cat4 = Ether
cat5 = 100Mbps
cat6 = 192.168.x..x
cat7 = 255.255.255.0

[no2]
cat1 = eth1
cat2 = Down
cat3 = 00:0B:5D:xx:xx:xx
cat4 = Ether
cat5 = 100Mbps
cat6 = -
cat7 = -

[no3]
    ⋮
```

COMPUTER-READABLE RECORDING MEDIUM, INFORMATION MANAGEMENT METHOD AND INFORMATION MANAGEMENT DEVICE

CROSS-REFERENCE TO RELATED APPLICATIONS

This application is a continuation application of International Application PCT/JP2010/052775 filed on Feb. 23, 2010 and designated the U.S., the entire contents of which are incorporated herein by reference.

FIELD

A certain aspect of the embodiments is related to a computer-readable recording medium, an information management method and an information management device.

BACKGROUND

There is known a server device that performs a given process based on a request from a communication terminal (See Japanese Laid-open Patent Publication No. 2004-127278). The server device transmits an e-mail including a URL address for acquiring a result of the performed process to the communication terminal before transmitting the result of the performed process to the communication terminal.

SUMMARY

According to an aspect of the present invention, there is provided a computer-readable recording medium having stored therein a program for causing a computer to execute a process, including: receiving a request of information from an information process unit having a CGI, as a first function; collecting the information corresponding to the request, as a second function; and requesting the second function to collect the information corresponding to the request in response to the request of information, and during a time period shorter than a timeout period of the CGI, generating progress information indicating progress of collection of the information and corrected information, and causing a display unit to display the progress information, as a third function.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a monitoring screen of a network interface card (NIC);

FIG. 4 is a diagram illustrating an example of a html template;

FIG. 6 is a diagram illustrating an example of a progress file;

DESCRIPTION OF EMBODIMENTS

Comparative Example

Figure 1:
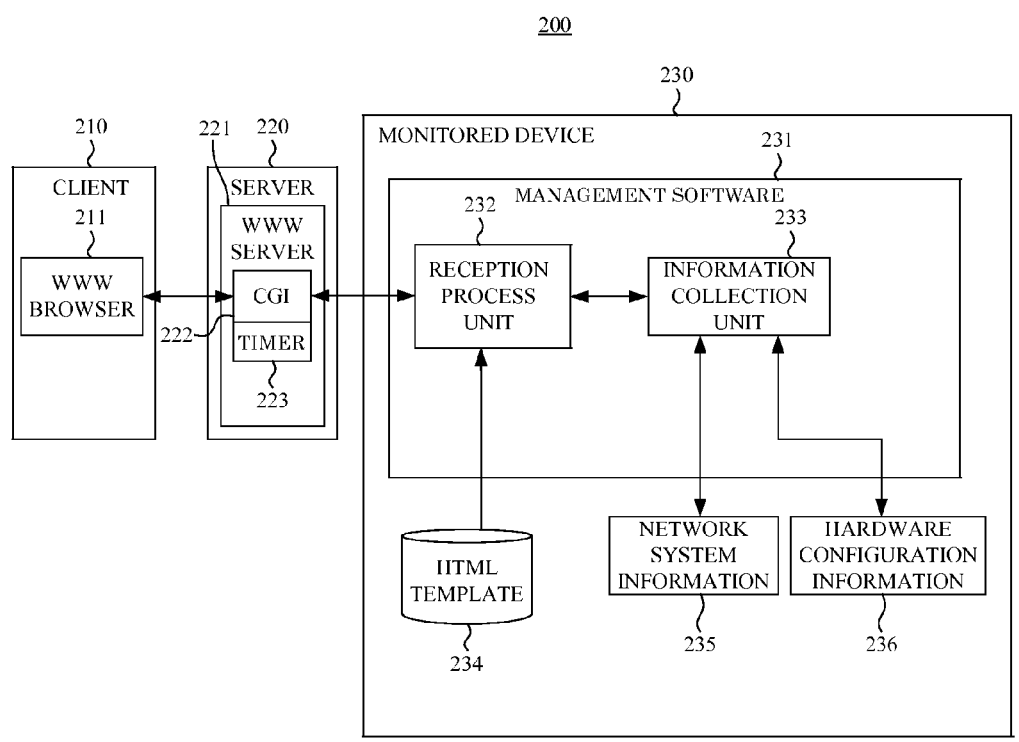
FIG. 1 is a block diagram illustrating an information management system including an information management device according to a reference example.

FIG. 1 is a block diagram illustrating an information management system including an information management device. Here, FIG. 1 also illustrates schematically functions performed by the operation of a software. An information management system 200 of FIG. 1 includes a client 210, a server 220 and a monitored device 230. The client 210 is connected to the server 220, and the server 220 is connected to the monitored device 230.

The client 210 is a computer and includes a WWW (World Wide Web) browser 211. The server 220 is a computer and includes a WWW server 221. Then, the WWW server 221 includes a CGI (Common Gateway Interface) 222 and a timer 223. The monitored device 230 includes a management software 231, a html (HyperText Markup Language) template 234, network system information 235 and hardware configuration information 236. The management software 231 includes a reception process unit 232 and an information collection unit 233. The management software 231 collects in real time the hardware configuration information 236 and the network system information 235 of the monitored device 230 through the CGI 222 of the WWW server 221 in response to a request from the WWW browser 211 of the client 210, and displays information as a monitoring screen on the WWW browser 211 of the client 210. Here, the monitoring screen is a screen displaying information collected by the management software 231. FIG. 2 illustrates an example of the monitoring screen of a network interface card (NIC). In this example, a Network Interfaces screen is displayed by selection of a Network Interfaces menu in a Network menu from the monitoring screen, and information on five NICs is displayed.

The management software 231 includes the reception process unit 232 and the information collection unit 233. When a request of a WEB page is transmitted from the WWW browser 211 to the WWW server 221 of the client 210, the WWW server 221 runs the CGI 222, and the CGI 222 requests the reception process unit 232 of the management software 231 to generate the WEB page. The reception process unit 232 requests the information collection unit 233 to collect information required for the requested WEB page. The information collection unit 233 collects the requested information in real time, and notifies the reception process unit 232 of the collected information. The reception process unit 232 which has received the information repeats an information collection request to the information collection unit 233 until all information required for the WEB page is collected. When all the information is collected, the reception process unit 232 generates html information by combining the collected information and the html templates 234, and notifies the CGI 222 of the generated html information.

The WWW server 221 terminates the CGI 222 and notifies the WWW browser 211 of the html information.

Here, the CGI 222 of the WWW server 221 includes a timer 223. When the collection of information takes time, timeout occurs in the CGI 222. In such a case, an administrator tunes up a timer value of the CGI 222 or induces operational attention to a user by cautionary statement to a manual.

When there is a great deal of information required for the requested WEB page in the management software 231, the reception process unit 232 requires time for the collection of information required for the requested WEB page, so that the CGI 222 is timeout and terminates before the reception process unit 232 notifies the WWW server 221 of the collected information. Therefore, the CGI 222 cannot return a response to the WWW browser. That is, the WWW browser 211 cannot display the WEB page. In this case, there is a means that changes the timer value of the CGI 222. However, only one timer value of the CGI 222 can be set to the WWW server 221, and influence by changing the timer value reaches also to another user who uses the WWW server 221. Therefore, the timer value of the CGI 222 cannot be changed easily.

Embodiment

A description will be given of the present embodiment, with reference to FIGS. 3 to 9.

Figure 3:
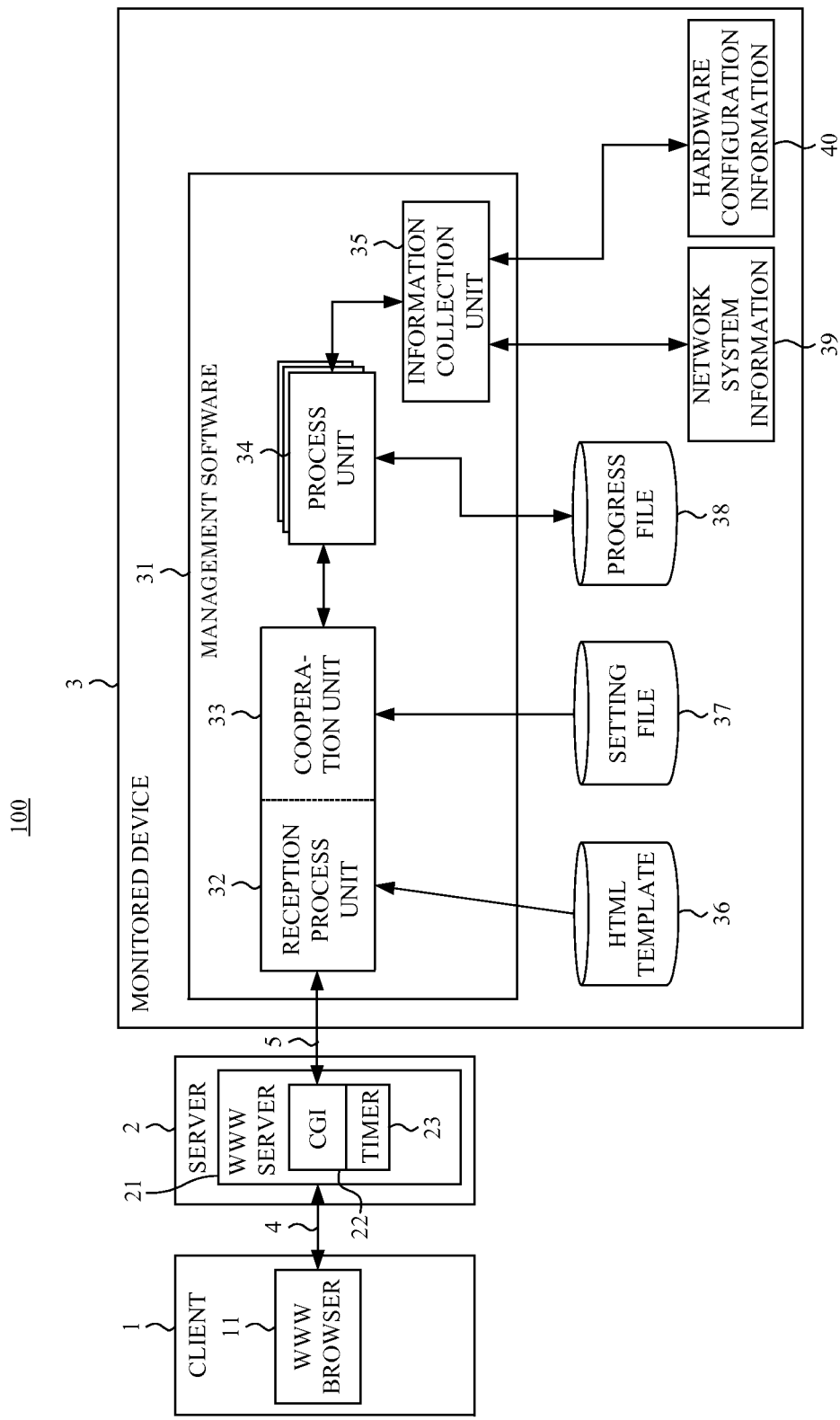
FIG. 3 is a block diagram illustrating an information management system including an information management device according to a present embodiment.

FIG. 3 is a block diagram illustrating an information management system including an information management device according to the present embodiment. Here, FIG. 3 also illustrates schematically functions performed by the operation of a software.

An information management system 100 of FIG. 3 includes a client 1, a server 2 (i.e., an information processing unit), and a monitored device (i.e., a information processing device) 3. The client 1 is connected to the server 2 via a network 4, and the server 2 is connected to the monitored device 3 via a network 5.

The client 1 is a computer and includes a WWW (World Wide Web) browser 11 (i.e., a display unit). The server 2 is a computer and includes a WWW server 21. Then, the WWW server 21 includes a CGI (Common Gateway Interface) 22 and a timer 23. The CGI 22 receives a response from the monitored device 3 and transmits the response to the WWW browser 11 of the client 1. When the CGI 22 cannot receive the response from the monitored device 3 even if time (hereinafter referred to as "timeout period") beforehand set to the timer 23 has elapsed, a reception process becomes timeout, and the CGI 22 cannot transmit the response from the monitored device 3 to the WWW browser 11.

The monitored device 3 includes a management software 31, a html (HyperText Markup Language) template 36, a setting file 37, a progress file 38, network system information 39 and hardware configuration information 40. The management software 31 includes a reception process unit 32 (i.e., a first function, a first step, and a reception means), a cooperation unit 33 (i.e., a fourth function and a fourth step), process units 34 (i.e., a third function, a third step and a process means), and information collection unit 35 (i.e., a second function, a second step and an information collection means). The management software 31 receives a request from the WWW browser 11 via the CGI 22, collects the network system information 39 and the hardware configuration information 40, and causes the WWW browser 11 to display these information.

The reception process unit 32 receives a request from the CGI 22 of the server 2, calls up one of the process units 34 through the cooperation unit 33. The cooperation unit 33 selects a process unit 34 corresponding to the information requested from the CGI 22 by referring to the setting file 37 using as a key the parameter received from the CGI 22, and calls up the selected process unit 34. The process unit 34 requests the information collection unit 35 to collect the information requested from the CGI 22, and notifies the reception process unit 32 of the progress of information collection by the information collection unit 35. The information collection unit 35 acquires the network system information 39 and the hardware configuration information 40 using a protocol such as Simple Network Management Protocol (SNMP).

The html template 36 is a template for displaying the network system information 39 and the hardware configuration information 40 in a html type. For example, FIG. 4 illustrates an example of the html template 36 for displaying information on a network interface in the html type. In FIG. 4, "ALL" is a column indicating the total number of network interfaces which are objects of information collection, and "FINISHED" is a column indicating the number of network interfaces in which the information collection has completed. "Interface Name" is a column indicating a name of the network interface. "Status" is a column indicating by "Up" that the network interface is in an enabled state, and by "Down" that the network interface is in a disabled state. "MAC address" is a column indicating a MAC address of the network interface. "Type" is a column indicating the standard of a network where the network interface is used. "Speed" is a column indicating a transfer rate of data which flows on the network interface. "IP Address" is a column indicating an IP address assigned to the network interface. "Subnet Mask" is a column that defines how many bits are used for the network address for identifying the network in the IP address.

Figure 5:
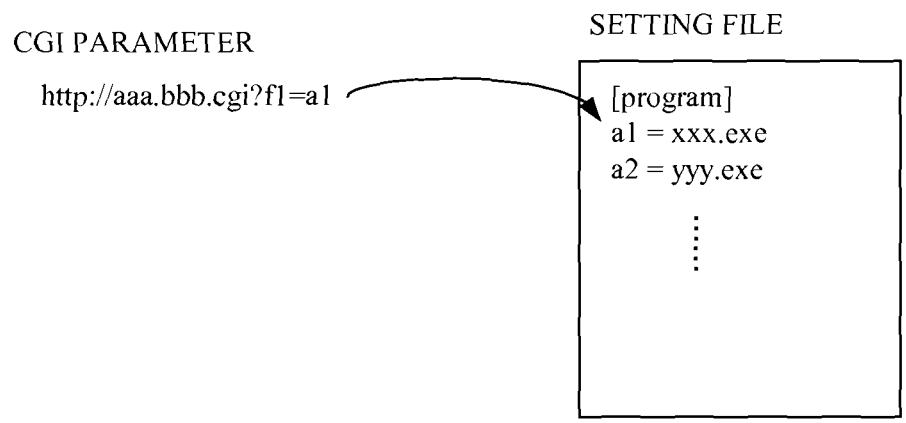
FIG. 5 is a diagram illustrating an example of a setting file.

The setting file 37 includes a list which associates parameters from the CGI 22 with the process units 34. FIG. 5 illustrates an example of the setting file 37. In FIG. 5, the parameter from the CGI 22 is "a1" or "a2", the process unit 34 corresponding to the parameter "a1" is an executable file which is "xxx.exe", and the process unit corresponding to the parameter "a2" is an executable file which is "yyy.exe". When a CGI parameter "http://aaa.bbb.cgi?f1=a1" is received from the CGI 22, the process unit 34 associated with the parameter "a1", i.e., "xxx.exe" is referred to from the setting file 37.

The progress file 38 includes progress information of the collection of the network system information 39 and the hardware configuration information 40, and concrete network system information 39 and concrete hardware configuration information 40 collected by the information collection unit 35. FIG. 6 illustrates an example of the progress file 38. The progress file 38 of FIG. 6 includes progress information (status) on the whole system indicating that collection of information on three network interfaces is completed among five network interfaces, and collected concrete information (no1, no2 . . . ) on each of the network interfaces.

The network system information 39 is information on setting of the network which is acquired from an OS (Operating System), not indicated, included in the monitored device 3, for example. The hardware configuration information 40 is information on hardware (e.g. a system board, a memory, a hard disk drive (HDD), an I/O unit and so on) included in the monitored device 3.

Figure 7A:
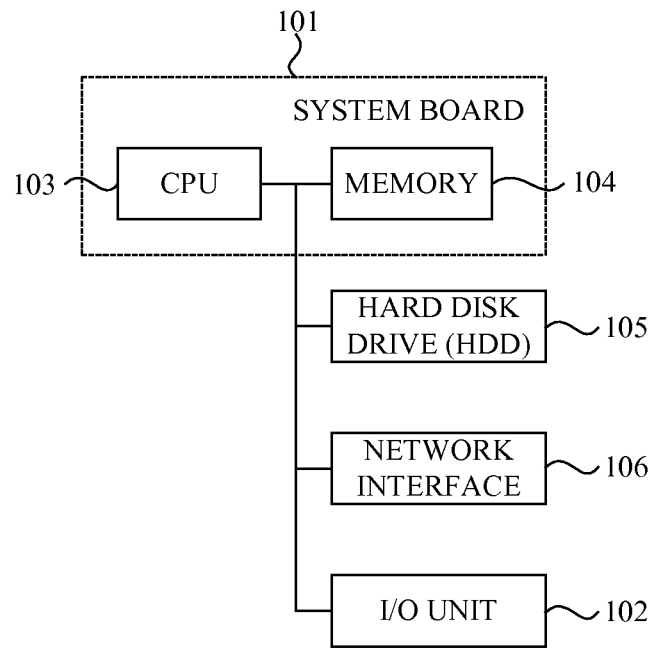
FIG. 7A is a diagram illustrating a hardware configuration of a monitored device.
Figure 7B:
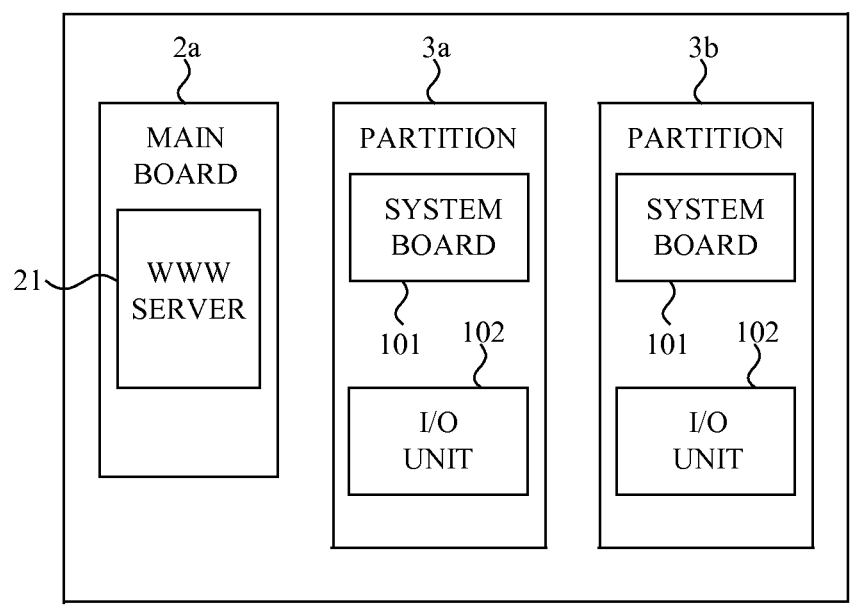
FIG. 7B is a diagram illustrating a variation example of the configuration of a server and the monitored device.

FIG. 7A is a diagram illustrating the hardware configuration of the server 2 and the monitored device 3. FIG. 7B is a diagram illustrating a variation example of the configuration of the server 2 and the monitored device 3.

As illustrated in FIG. 7A, the monitored device 3 includes a system board 101 and an I/O (Input/Output) unit 102 that inputs and outputs information from/to the outside of the monitored device 3. A CPU 103 that controls the whole monitored device 3 and a memory 104 that functions as a working area and stores a given program are mounted on the system board 101. A hard disk drive (HDD) 105 that stores the OS and the management software 31 and a network interface 106 are connected to the system board 101. In addition, the I/O unit 102 is connected to the system board 101. The CPU 103 executes the management software 31, so that the reception process unit 32, the cooperation unit 33, the process units 34 and the information collection unit 35 included in the management software 31 are achieved.

When a single computer has a main board 2a which includes the WWW server 21, and a plurality of partitions 3a and 3b each of which includes the system board 101 and the I/O unit 102, as illustrated in FIG. 7B, the main board 2a may achieve the function of the server 2 and each of the partitions 3a and 3b may achieve the function of the monitored device 3, for example. Thus, the server 2 and one or more monitored device 3 can be achieved by the single computer.

Here, as is the case with FIG. 7A, the system board 101 of FIG. 7B mounts the CPU 103 and the memory 104, and the hard disk drive (HDD) 105, the I/O unit 102 and the network interface 106, not indicated, are connected to the system board 101.

Figure 8:
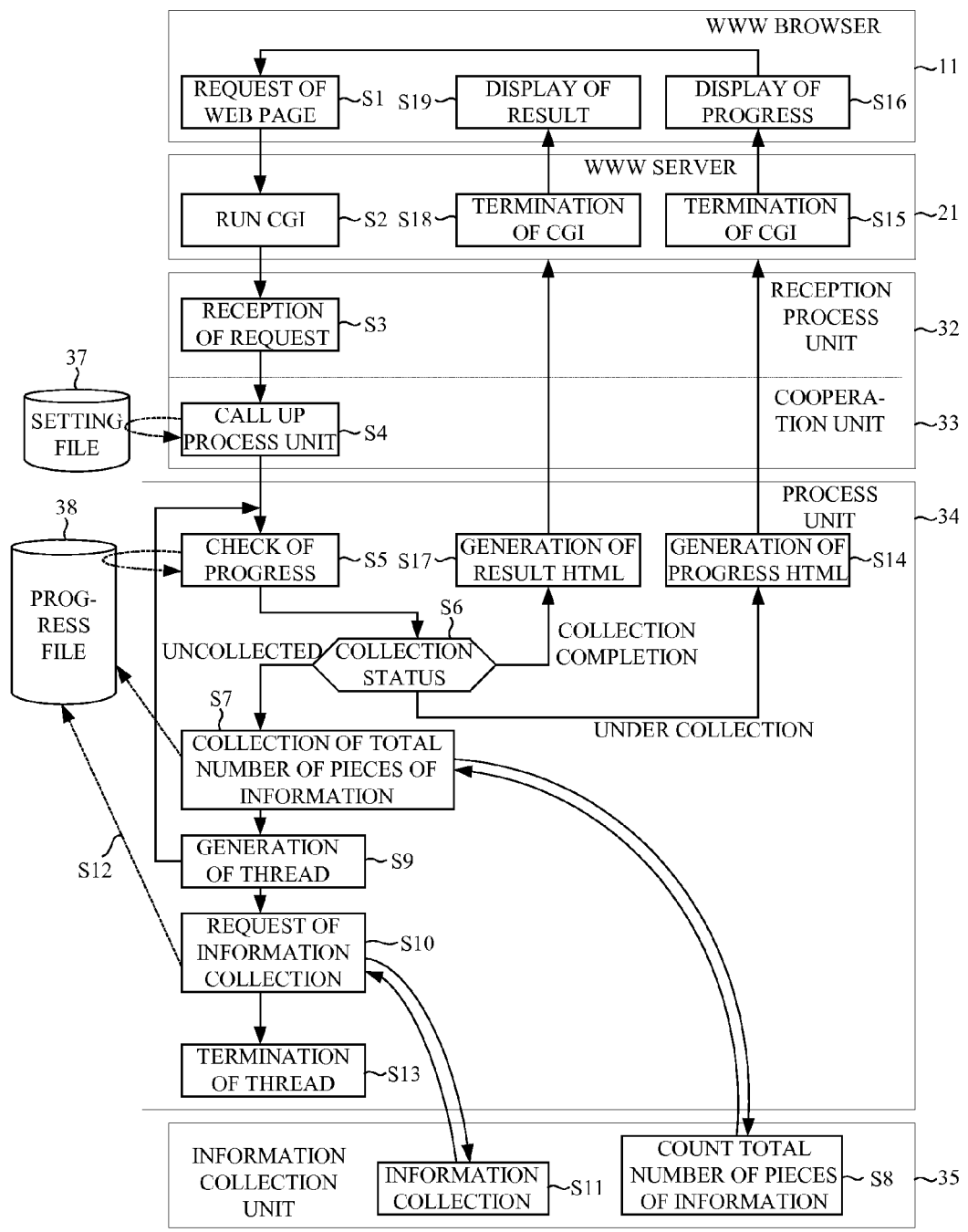
FIG. 8 is a flowchart illustrating a process performed with the information management system.

FIG. 8 is a flowchart illustrating a process performed with the information management system.

First, the WWW browser 11 requests the WEB page from the WWW server 21 (step S1). The WWW server 21 runs the CGI 22 corresponding to the requested WEB page and outputs the request of the WEB page to the reception process unit 32 (step S2). The reception process unit 32 receives the request of the WEB page from the WWW server 21 (step S3). The cooperation unit 33 selects the process unit 34 corresponding to the requested WEB page by referring to the setting file 37 using the parameter included in the request from the CGI 22 as a key, and calls up the selected process unit (step S4).

The process unit 34 called up by the cooperation unit 33 checks the progress of collection of information required for the monitoring of the monitored device 3 with reference to the progress file 38 (step S5). The information required for the monitoring of the monitored device 3 is information such as "Interface Name", "Status", "MAC Address", "Type", "Speed", "IP Address" and "Subnet Mask" when the network interface in the monitored device 3 is monitored, for example. When there is not the progress file 38, the process unit 34 generates an empty file newly.

When the information required for the monitoring of the monitored device 3 is not collected at all (uncollected of step S6), the process unit 34 requests the information collection unit 35 to collect the total number of pieces of information required for the monitoring of the monitored device 3 (step S7). Here, when five network interfaces are monitored for example, the progress html which the process unit 34 generates requires five sets of information on the network interfaces, in order to indicate the progress. However, when the process unit 34 knows the total number of pieces of required information on the network interface beforehand, the total number of pieces of required information is not used, so that the process of step S7 can be omitted.

The information collection unit 35 counts only the number of pieces of information to be collected in response to a request from the process unit 34 in step S7, and notifies the process unit 34 of the number of pieces of information (step S8). When the network interface is monitored and the monitored device 3 has five network interfaces, for example, the information collection unit 35 notifies the process unit 34 that the information on the network interface to be collected is five sets. Then, the process unit 34 writes the counted value notified from the information collection unit 35, i.e., the total number of pieces of information required for the monitoring of the monitored device 3, in the progress file 38 (step S7). After the total number of pieces of information to be collected is notified from the information collection unit 35, the process unit 34 generates a thread (step S9) and suitably checks the progress of information collection (step S5). Here, before returning to step S5 from step S9, the process unit 34 waits for only a time period shorter than the timeout period of the CGI 22. When the process unit 34 is called up by the cooperation unit 33, the process unit 34 starts counting the waiting time. The timeout period of the CGI 22 may be registered into the process unit 34 beforehand, or the timeout period of the CGI 22 may be included in the parameter from the CGI 22 and the process unit 34 may be informed of the timeout period of the CGI 22. When there is little information to be collected, the collection of the information is completed in time shorter than the waiting time of the process unit 34. Therefore, the process unit 34 can send back a result html without sending back the progress html before the timeout period of the CGI 22 elapses.

Although the process unit 34 suitably checks the progress of information collection after waiting for only the time period shorter than the timeout period of the CGI 22 (step S5), the similar waiting is performed also when the information required for the monitoring of the monitored device 3 is under collection (under collection of step S6) and also when all the information have been collected (collection completion of Step S6). This is because, during a time period from the request of the WEB page (step S1) to the completion of information collection, the process unit 34 continuously performs check of progress (step S5), generation and transmission of the progress html described later (step S14), and generation and transmission of the result html described later (step S17), in timing before the CGI 22 causes the timeout. Thus, the process unit 34 prevents the CGI 22 from causing the timeout during the time period from the request of the WEB page (step S1) to the completion of information collection.

The process unit 34 requests the information collection unit 35 to collect the information required for the monitoring of the monitored device 3 from the thread generated in step S9 (step S10). The information collection unit 35 receives the request from the process unit 34 of step S10, collects the information required for the monitoring of the monitored device 3, and transmits the collected information to the process unit 34 (step S11). Whenever the thread of the process unit 34 acquires one piece of information from the information collection unit 35, the thread of the process unit 34 updates the progress file 38 (step S12). When the collection of the information required for the monitoring of the monitored device 3 is completed, the process unit 34 terminates (or deletes) the thread (step S13). As described above, check of the progress of the information collection (step S5), request of the information collection (step S10), the information collection (step S11) and update of the progress file 38 (step S12) are performed after the process unit 34 generates the thread (step S9). Here, the process of step S5 and the processes of steps S10 to S12 are performed independently. That is, the information collection and check of the progress proceed independently.

Figure 9:
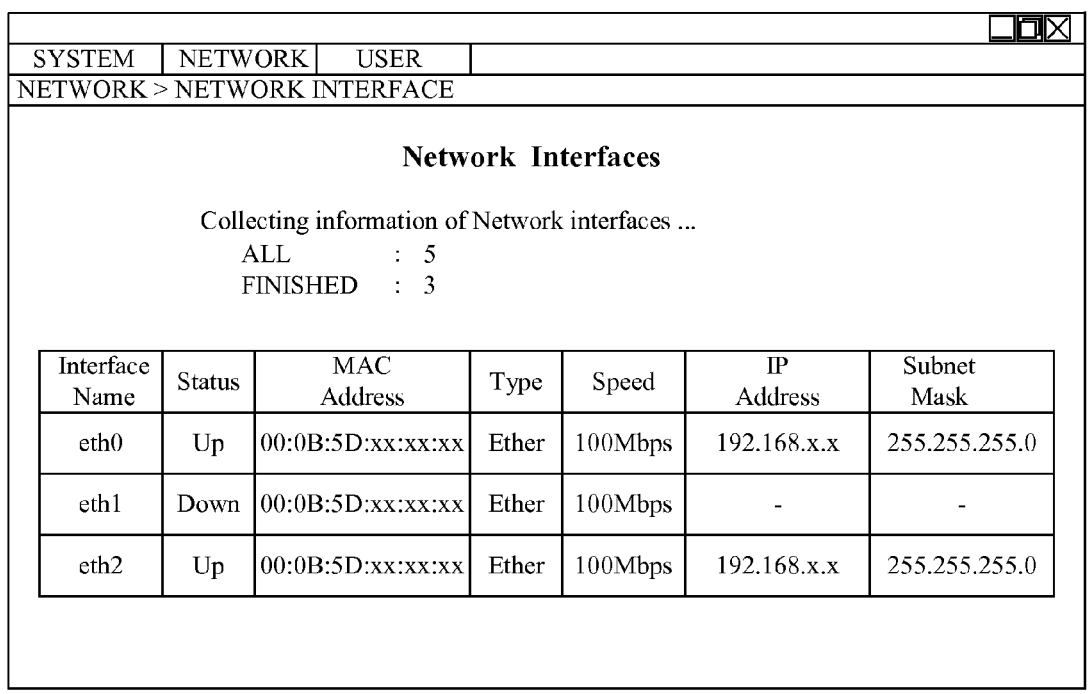
FIG. 9 is a diagram illustrating an example of a screen displayed using a WWW browser which has received the progress html.

When the information required for the monitoring of the monitored device 3 is under collection after the progress of step S5 is checked (under collection of step S6), the process unit 34 generates a html (i.e., progress html) indicating that the information is under collection, based on the progress file 38, and transmits the progress html to the WWW server 21 via the reception process unit 32, during the time period shorter than the timeout period of the CGI 22 (step S14). The progress html is generated on the basis of a generated time of the thread, for each constant period shorter than the timeout period of the CGI 22, and is transmitted to the WWW server 21. Here, when generating the progress html, the process unit 34 gives a description of "refresh" to the progress html as a meta tag. The "refresh" of the meta tag can specify a time for making the WWW browser 11 retry, and the address of the CGI 22. Therefore, the process unit 34 generates the progress html that specifies the time for making the WWW browser 11 retry, and the address of the CGI 22, transmits the generated progress html to the WWW browser 11, and hence causes the WWW browser 11 to automatically re-request the process of Step S1 within the time period shorter than the timeout period. FIG. 9 illustrates an example of a screen displayed using the WWW browser 11 which has received the progress html. The progress of the information collection and the collected information, such as a progress bar and an intermediate result of the information collection for example, are included in the screen displayed using the WWW browser 11 which has received the progress html.

When receiving the progress html from the process unit 34, the WWW server 21 terminates the CGI 22, and transmits the progress html received from the process unit 34, to the WWW browser 11 (step S15). The WWW browser 11 receives the progress html, and displays a corresponding screen (step S16). Moreover, the WWW browser 11 performs the process of step S1 again after a given time period (e.g. 2 seconds) according to the time specified by the "refresh" of the meta tag embedded in the progress html.

Here, when the information required for the monitoring of the monitored device 3 is under collection (under collection of step S6), the process unit 34 collects the information using the thread generated in step S9 in parallel with generating the progress html and causing the WWW browser 11 to display the progress html via the WWW server 21. Thereby, the required information can be collected and the progress information can be generated and displayed in a short time.

When all the information required for the monitoring of the monitored device 3 is collected after the progress of step S5 is checked (collection completion of step S6), the process unit 34 generates the result html indicating a WEB page to be displayed and including a result of the information collection, and transmits the result html to the WWW server 21 via the reception process unit 32, during the time period shorter than the timeout period of the CGI 22 (step S17). The WWW server 21 terminates the CGI 22 and transmits the result html received from the process unit 34, to the WWW browser 11 (step S18). The WWW browser 11 receives and displays the result html (step S19). Since the "refresh" of the meta tag is not embedded in the result html, the process is terminated at step S19.

As described above, according to the embodiment, the reception process unit 32 receives a request of information from the WWW server 21 having the CGI, and the information collection unit 35 collects the information corresponding to the request. The process unit 34 requests the information collection unit 35 to collect the information corresponding to the request, in response to the request of the information. Moreover, the process unit 34 generates the progress html indicating the progress of the information collection and the collected information, and causes the WWW browser 11 to display the progress html via the WWW server 21, during the time period shorter than the timeout period of the CGI. Therefore, the disconnection of communication with the WWW server 21 can be prevented, and the user can check the progress of process in real time.

In addition, when the process unit 34 generates the progress html, the process unit 34 embeds into the progress html the meta tag in which the WWW server 21 requests the WEB page again. Therefore, the user can check the progress of process continuously, without paying particular attention to a request again.

Further, the process unit 34 is decided by the CGI parameter and the setting file which are sent to CGI 22, and generates the progress html and the result html. Therefore, also when a WEB page is added newly, it is possible to incorporate a unique process for each WEB page, without adding change to the CGI 22 or the reception process unit 32.

In the above-mentioned embodiment, the process unit 34 generates the thread (step S9), and requests the information collection unit 35 to collect the information required for the monitoring of the monitored device 3 from the thread generated in step S9 (step S10). Alternatively, the process unit 34 may generate a child process, and request the information collection unit 35 to collect the information required for the monitoring of the monitored device 3 from the generated child process. Here, the child process is a subprogram called up from a main program (parent process) which the process unit 34 runs.

A non-transitory recording medium on which the software program for realizing the functions of the monitored device 3 is recorded may be supplied to the monitored device 3, and the CPU 103 may read and execute the program recorded on the non-transitory recording medium. In this manner, the same effects as those of the above-mentioned embodiments can be achieved. The non-transitory recording medium for providing the program may be a CD-ROM (Compact Disk Read Only Memory), a DVD (Digital Versatile Disk), a Blu-ray Disk, SD (Secure Digital) card or the like, for example.

Alternatively, the CPU 103 of the monitored device 3 may execute a software program for realizing the functions of the monitored device 3, so as to achieve the same effects as those of the above-described embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable recording medium having stored therein a program for causing a computer to execute a process, the process comprising:

receiving a request for information, as a first function, from a server that is connected to the computer and has a Common Gateway Interface (CGI);

collecting the information corresponding to the request, as a second function; and requesting the second function to collect the information corresponding to the request in response to the request of information, and during a time period shorter than a timeout period of the CGI, generating progress information indicating progress of collection of the information and collected information, and outputting the progress information to the server, as a third function, wherein the third function embeds data in which a client requests the information from the server again, into the progress information, during the time period shorter than the timeout period of the CGI, so that the client requests the information from the server again before the time period of the CGI elapses, wherein the progress information includes a total number of pieces of information corresponding to the request and a number of pieces of information in which the collection has completed, wherein the third function generates a thread or a process that collects the information corresponding to the request from the second function, and generates the progress information and outputs the progress information to the server in parallel with collecting the information by the thread or the process.

2. The non-transitory computer-readable recording medium as claimed in claim 1, wherein when collection of the information is completed, the third function generates result information indicating a result of collection of the information and outputs the result information to the server.

3. The non-transitory computer-readable recording medium as claimed in claim 1, wherein the computer-readable recording medium includes a plurality of third functions, and the computer-readable recording medium comprises a fourth function that selects a third function corresponding to the requested information from among the plurality of third functions.

4. The non-transitory computer-readable recording medium as claimed in claim 1, wherein the information requested from the server is information on setting of a network and information on hardware.

5. The non-transitory computer-readable recording medium as claimed in claim 1, wherein the third function checks whether the information corresponding to the request has been collected, and when the information has not been collected, the third function embeds data in which the client requests the information from the server again, into the progress information, during the time period shorter than the timeout period of the CGI.

6. An information management method comprising:

receiving, by a processor of a computer, a request of information from a server that is connected to the computer and has a Common Gateway Interface (CGI), as a first step;

collecting, by the processor, the information corresponding to the request, as a second step; and requesting, by the processor, the second step to collect the information corresponding to the request in response to the request of information, and during a time period shorter than a timeout period of the CGI, generating progress information indicating progress of collection of the information and collected information, and outputting the progress information to the server, as a third step, wherein the third step embeds data in which a client requests the information from the server again, into the progress information, during the time period shorter than the timeout period of the CGI, so that the client requests the information from the server again before the time period of the CGI elapses, wherein the progress information includes a total number of pieces of information corresponding to the request and a number of pieces of information in which the collection has completed, wherein the third step generates a thread or a process that collects the information corresponding to the request from the second function, and generates the progress information and outputs the progress information to the server in parallel with collecting the information by the thread or the process.

7. The information management method as claimed in claim 6, wherein when collection of the information is completed, the third step generates result information indicating a result of collection of the information and outputs the result information to the server.

8. The information management method as claimed in claim 6, wherein the information management method includes a plurality of third steps, and the information management method comprises selecting a third step corresponding to the requested information from among the plurality of third steps.

9. The information management method as claimed in claim 6, wherein the information requested from the server is information on setting of a network and information on hardware.

10. The information management method as claimed in claim 6, wherein the third step checks whether the information corresponding to the request has been collected, and when the information has not been collected, the third step embeds data in which the client requests the information from the server again, into the progress information, during the time period shorter than the timeout period of the CGI.

11. An information management device comprising:

a receiver that receives a request of information from a server that is connected to a client and has a Common Gateway Interface (CGI);

an information collector that collects the information corresponding to the request; and a hardware processor that requests the information collector to collect the information corresponding to the request in response to the request of information, and during a time period shorter than a timeout period of the CGI, generates progress information indicating progress of collection of the information and collected information, and outputs the progress information to the server, wherein the hardware processor embeds data in which the client requests the information from the server again, into the progress information, during the time period shorter than the timeout period of the CGI, so that the client requests the information from the server again before the time period of the CGI elapses, wherein the progress information includes a total number of pieces of information corresponding to the request and a number of pieces of information in which the collection has completed, wherein embedding generates a thread or a process that collects the information corresponding to the request from the second function, and generates the progress information and outputs the progress information to the server in parallel with collecting the information by the thread or the process.

12. The non-transitory computer-readable recording medium as claimed in claim 1, wherein the data in which the client requests the information from the server again includes a time for making a browser of the client retry, and an address of the CGI.

13. The information management method as claimed in claim 6, wherein the data in which the client requests the information from the server again includes a time for making a browser of the client retry, and an address of the CGI.

14. The information management device as claimed in claim 11, wherein the hardware processor checks whether the information corresponding to the request has been collected, and when the information has not been collected, the hardware processor embeds data in which the client requests the information from the server again, into the progress information, during the time period shorter than the timeout period of the CGI.

* * * * *